United States Patent
Zeavelou et al.

(10) Patent No.: US 12,481,491 B2
(45) Date of Patent: Nov. 25, 2025

(54) EXTERNAL WEATHER CONDITIONS AWARE FIRMWARE UPDATES

(71) Applicant: DELL PRODUCTS L.P., Round Rock, TX (US)

(72) Inventors: Palani Raja Zeavelou, Pondicherry (IN); Santosh Gore, Bangalore (IN); Gargi Priyadarshini, Tezpur (IN); Rahul Ranjan, Dehradun (IN); Rushyendra Velamuri, Bangalore (IN); Priti Parate, Nagpur (IN)

(73) Assignee: Dell Products L.P., Round Rock, TX (US)

( * ) Notice: Subject to any disclaimer, the term of this patent is extended or adjusted under 35 U.S.C. 154(b) by 232 days.

(21) Appl. No.: 18/330,514

(22) Filed: Jun. 7, 2023

(65) Prior Publication Data

US 2024/0411538 A1    Dec. 12, 2024

(51) Int. Cl.
*G06F 8/65* (2018.01)

(52) U.S. Cl.
CPC ..................... *G06F 8/65* (2013.01)

(58) Field of Classification Search
USPC ....................................................... 717/168
See application file for complete search history.

(56) References Cited

U.S. PATENT DOCUMENTS

| | | | |
|---|---|---|---|
| 10,082,309 B2 * | 9/2018 | Castillo | H04L 67/12 |
| 11,321,075 B1 | 5/2022 | Gore et al. | |
| 2011/0145811 A1 * | 6/2011 | Middendorf | F03D 7/047 700/287 |
| 2017/0337068 A1 * | 11/2017 | Maria | H04W 4/40 |
| 2020/0225928 A1 * | 7/2020 | Rusev | H04L 67/12 |
| 2020/0350778 A1 * | 11/2020 | Nemecek | H04L 67/34 |
| 2021/0406064 A1 | 12/2021 | Messick et al. | |

OTHER PUBLICATIONS

Catuogno et al. "Secure Firmware Update: Challenges and Solutions," MDPI, 2023. (Year: 2023).*
Heeger et al., "Secure LoRa Firmware Update with Adaptive Data Rate Techniques," MDPI, 2021. (Year: 2021).*
Mahfoudhi et al., "Over-the-Air Firmware Updates for Constrained NB-IoT Devices," MDPI, 2022. (Year: 2022).*

* cited by examiner

*Primary Examiner* — Ryan D. Coyer
(74) *Attorney, Agent, or Firm* — Larson Newman, LLP

(57) ABSTRACT

An information handling system includes a storage and a processor. The storage stores a firmware update for a component of the information handling system. The processor receives a firmware update notification. The firmware update notification is associated with the firmware update for the component. The processor determines whether the component is weather dependent. In response to the firmware update being weather dependent, the processor determines whether the firmware update currently may be performed based on a weather report for a location of the information handling system. In response to a determination that the firmware update may be performed, the processor performs the firmware update on the component.

20 Claims, 4 Drawing Sheets

EXTERNAL WEATHER CONDITIONS AWARE FIRMWARE UPDATES

FIELD OF THE DISCLOSURE

The present disclosure generally relates to information handling systems, and more particularly relates to external weather conditions aware firmware updates.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a storage and a processor. The storage may store a firmware update for a component of the information handling system. The processor may receive a firmware update notification. The firmware update notification is associated with the firmware update for the component. The processor may determine whether the component is weather dependent. In response to the firmware update being weather dependent, the processor may determine whether the firmware update currently may be performed based on a weather report for a location of the information handling system. In response to a determination that the firmware update may be performed, the processor may perform the firmware update on the component.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
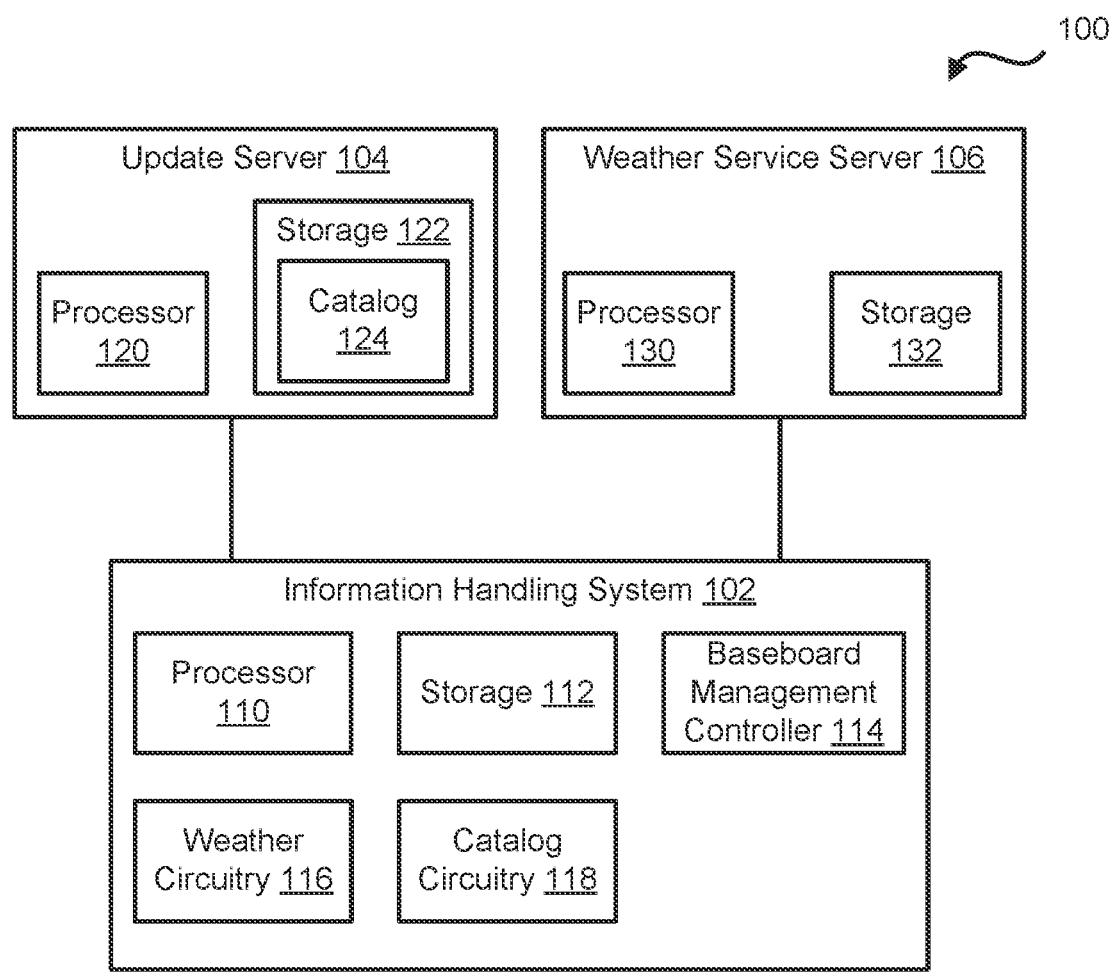
FIG. 1 is a block diagram of a system including an information handling system, an update server, and a weather service server according to at least one embodiment of the present disclosure.

FIG. 1 illustrates a system 100 including an information handling system 102, an update server 104, and a weather service server 106 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 102 includes a processor 110, a storage 112, a baseboard management controller 114, weather circuitry 116, and catalog circuitry 118. Information handling system 102 may include any suitable number of additional components, such as a microcontroller unit (MCU), cooling fans, or the like, without varying from the scope of this disclosure. Update server 104 includes a processor 120 and a storage 122. In an example, storage 122 may store any suitable data associated with one or more firmware updates, such as a catalog 124. Update server 104 may include any suitable number of additional components without varying from the scope of this disclosure. Weather service server 106 includes a processor 130 and a storage 132. In an example, storage 132 may store any suitable data such as weather forecasts 134. Weather service server 106 may include any suitable number of additional components without varying from the scope of this disclosure. System 100 may include any suitable number of additional components or information handling systems without varying from the scope of this disclosure.

In an example, information handling system 102 may be any suitable computing device, such as an edge server. In certain examples, edge servers may include critical components for a variety of industries, such as manufacturing, healthcare, automobile, or the like. Information handling system 102 may be placed at the 'edge' of a network such that it is physically as close as possible to a system or application that generates or accumulates data. Consequently, edge servers, such as information handling system 102, may be installed in places with extreme conditions. In certain examples, the extreme locations may be any suitable locations including, but not limited to, an offshore oil rig, in the middle of a desert, and in an extremely low temperature location. In an example, information handling system 100 may contain specific components to support these extreme conditions, such as MCU for heating the information handling system in low temperature condition, cooling fan for cooling the information handling system in extremely high temperature locations, or the like.

In certain examples, update server 104 may include different updates for components of information handling system 102 and these updates may be published in catalog 124. In an example, the updates may be associated with the firmware of components and may provide any suitable changes to the components including, but not limited to, addressing security concerns, and adding new enhancements. In certain examples, the updates for different components of information handling system 102 may result in extreme temperatures within the information handling system.

In previous information handling systems, updates to components may be performed at any time, such as when the update is first published, during a random time period, or the like. However, information handling systems performing the updates at random times may result in unplanned downtime of the components in the information handling system. In previous information handling systems, the unplanned downtime of components may result in extreme temperatures of the information handling systems, which in turn may damage the components.

Information handling system 102 may improve performance of updates to the components by adopting a weather condition aware approach to update the components to ensure minimum or no downtime. For example, if information handling system 102 is in a location where the temperature is extremely high during daytime and relatively lower at nighttime, a fan component of the information handling system should be recommended to be updated during nighttime. This recommendation would prevent overheating within information handling system 102 while the fan component is turned off during periods of the update being installed. In an example, a MCU may be utilized to heat information handling system 102, such that another recommendation may be to update the MCU during the afternoon when temperature is relatively high instead of at night when the weather may be extremely cold. This recommendation would prevent extreme low temperatures within information handling system 102 while the MCU component is turned off during periods of the update being installed.

During operation of information handling system 102, update server 104, and weather service server 106, updates for components within the information handling system may be published to catalog 124. In certain examples, catalog 124 may include data associated with updates to components within information handling system 102, such as the published updates, component threshold temperature values, or the like. Catalog 124 may be referred to as a threshold information catalog herein. In an example, the component threshold temperature values may indicate different temperature values that provide a limit as to a temperature range that the updates may be perform. In this example, if a component temperature is beyond the threshold temperature, processor 110 updating the components beyond the threshold temperature value may lead a shutdown of information handling system 102. In certain examples, the threshold temperature value for one component may be a maximum temperature value, and the threshold temperature value for another component may be a minimum temperature value. In an example, the component may not have an associated threshold temperature value.

In an example, processor 130 of weather service server 106 may service weather forecast data from any suitable weather service. Weather service server 106 may fetch the weather forecast data from any well-known weather API available publicly by a city, a state, or a country, and by longitude and latitude of the various servers in the data centers. Processor 130 may store the forecast data in storage 132 for use by information handling system 102. In certain examples, processor 130 may update the weather forecast data at different intervals. For example, the weather forecast update interval may be periodic, such as once daily, twice daily, once a week, once a month, or the like, In an example, processor 130 may pull the weather forecast at different intervals, a weather service may push the weather forecast at different intervals, or the like. The weather forecast data may include current temperatures for the location of information handling system 102, future temperatures for the location, or the like. Weather service server 106 may determine the location of information handling system 102 in any suitable manner including, but not limited to, a geolocation position of the information handling system.

In certain examples, update server 104 may receive an update for a component of information handling system 102. In response to the update, update server 104 may provide an update notification to information handling system 102. In an example, the update notification may include any suitable data associated with the update. For example, the update notification may include the update, an identification of the component associated with the update, the threshold temperature value for the component from catalog 124, or the like. In response to processor 110 receiving the update notification, the processor may retrieve the data in the notification in storage 112. This data may include the update, the threshold temperature value for the component, or the like.

In an example, if the update notification does not include the update and/or the threshold temperature value, catalog circuitry 118 may retrieve the update and/or the threshold temperature value from catalog 124. In response to retrieving the update and/or the threshold temperature value, catalog circuitry 118 may store this data in storage 112. In certain examples, catalog circuitry 118 may be a separate physical hardware component from processor 110, as shown in FIG. 1, or may be integrated into the processor without varying from the scope of this disclosure. Based on the threshold temperature value, processor 110 may determine whether the component/update is weather dependent. For example, if the component/update has a corresponding threshold temperature value, the component/update may be weather dependent. However, if the component/update does not have a corresponding threshold temperature value, the component/update may not be weather dependent. In an example, if the component/update is not weather dependent, processor 110 may proceed and perform the update for the component.

In an example, catalog circuitry 118 may download the catalog data from update server 104 and the catalog data may include the weather information. Processor 110 may fetch data associated with the critical components to be updated from BMC 114, read current temperatures associated with the components and compare these temperatures against the data in the catalog. In an example, the data in the catalog may include a threshold updating temperature for each of the components within information handling system 102. In certain examples, the critical components may include, but are not limited to, a cooling fan and a microcontroller unit. Processor 110 may determine whether a temperature of a critical component to be updated is within a threshold updating temperature range, such as below or above an extreme temperature value. In an example, if the current temperature of the critical component is within the threshold updating temperature range, processor 110 may provide a notification to a system administrator that the component will be updated. After providing the notification, processor 110 may perform the update process for the firmware of the critical component. However, if the current temperature of the component is outside the threshold temperature range, such as a threshold temperature is reached, based on this determination processor 110 may provide an extreme temperature notification to the system administration.

Based on the current temperature of the component is outside the threshold temperature range, weather circuitry 116 may query the server location for information handling system 102, pass on the location data to weather service server 106. Based on the location data, weather service server 106 may determine a weather forecast for information handling system 102. In an example, the weather information may be fetched from the weather sensors which are available in deployed places around information handling system 102. Weather service server 106 may provide the weather forecast to weather circuitry 116. In response to the reception of the weather forecast, weather circuitry 116 may provide the weather forecast to processor 110.

Processor 110 may analyze the weather information, such as the weather forecast, received from the service and the catalog data received from update server 104 via catalog circuitry 118. In an example, processor 110 may utilize the weather information to determine an update schedule for the component. Processor 110 may provide the update schedule as a notification to the system administrator. Based on the update schedule, processor 110 may preform the update for the component at a time when the temperature at information handling system 102 is within the threshold temperature range of the component.

Figure 2:
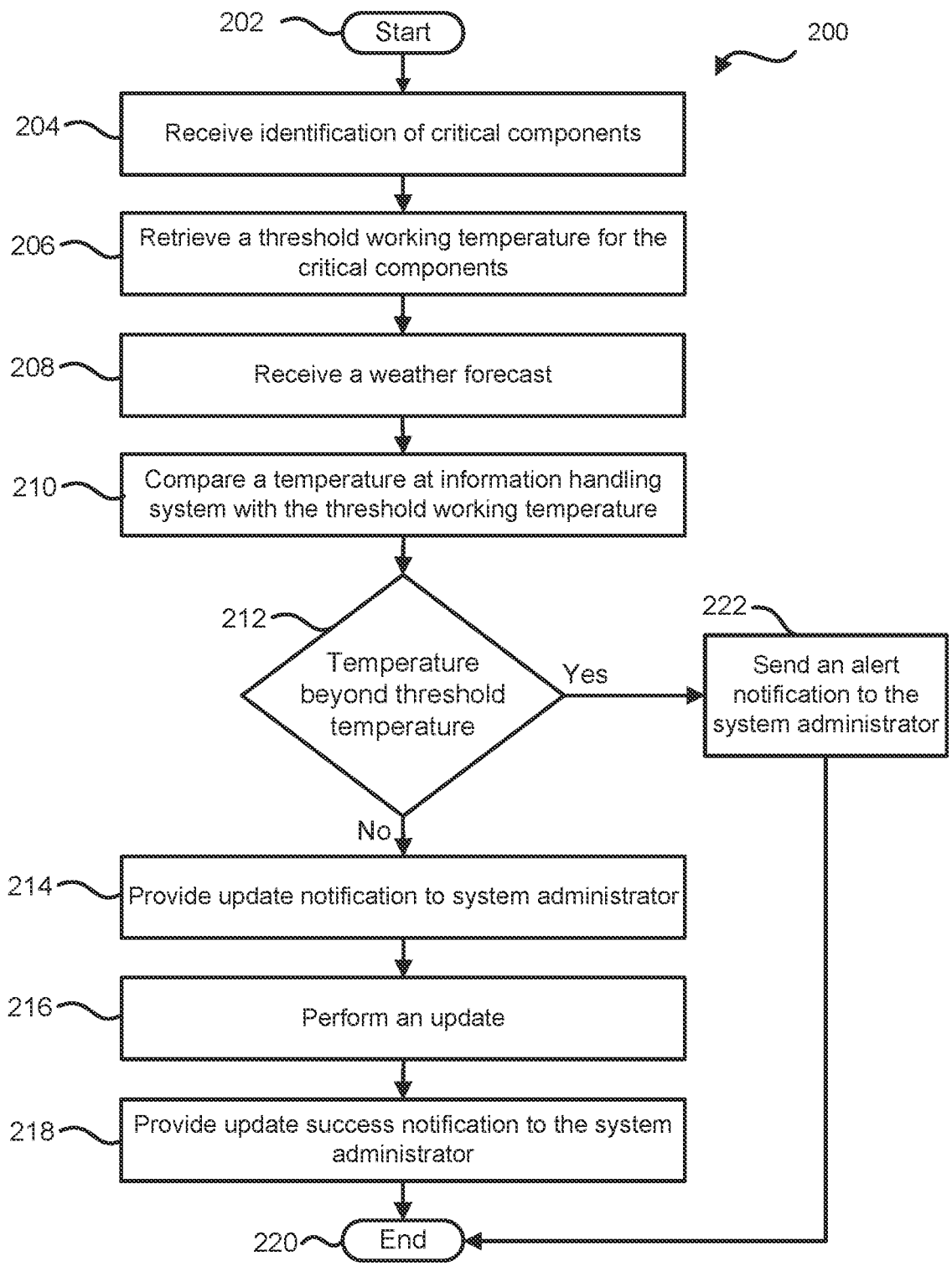
FIG. 2 is a flow diagram of a method for determining whether a firmware update may be performed in an information handling system according to at least one embodiment of the present disclosure.

FIG. 2 illustrates a flow of a method 200 for determining whether a firmware update may be performed in an information handling system according to at least one embodiment of the present disclosure, starting at block 202. In an example, method 200 may be performed by any suitable component including, but not limited to, processor 110, baseboard management controller 114, and weather circuitry 116 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 204, an identification of critical components for an information handling system is received. In an example, the identification of critical components may be received from a baseboard management control of the information handling system. In certain examples, the critical component may include any suitable components, such as a cooling fan, a microcontroller unit, or the like. Critical components may be utilized in an information handling system to regulate temperatures within the information handling system. For example, a cooling fan may be utilized to prevent other components within the information handling system from exceeding an extreme high or extreme low temperature that may result in the components needing to be shutdown to prevent damage to the components.

At block 206, threshold working temperatures for the critical components are retrieved. In an example, the baseboard management controller may provide the threshold working temperatures. In certain examples, a threshold working temperature may be either an extreme high temperature or an extreme low temperature. At block 208, a weather forecast is received. In an example, the weather forecast may be based on a geographic location of the information handling system and may include predicted temperatures at the location of the information handling system at different future times. At block 210, a temperature at the information handling system is compared with the threshold working temperature for a particular critical component. In an example, the information handling system may include one or more temperature sensor to detect and measure the temperature of the information handling system. In certain examples, the temperature sensors also may be located outside of and near the information handling system.

At block 212, a determination is made whether a current temperature at the information handling system is beyond a threshold temperature. In an example, if the threshold temperature is a low threshold temperature, the current temperature may be beyond the threshold temperature when the temperature is below the threshold temperature. If the threshold temperature is a high threshold temperature, the current temperature may be beyond the threshold temperature when the temperature is above the threshold temperature.

If the temperature of the information handling system is not beyond the threshold temperature, an update notification is provided to a system administrator at block 214. In an example, the update notification may indicate that the update will be performed for the component, such as a critical component. At block 216, an update is performed. In an example, the update may be a firmware update for the component. During the update, the component may be shutdown for a particular amount of time. At block 218, an update success notification is provided to the system administrator and the flow ends at block 220. Returning to block 212, if the temperature of the information handling system is beyond the threshold temperature, an alert message notification is provided to a system administrator at block 214.

Figure 3:
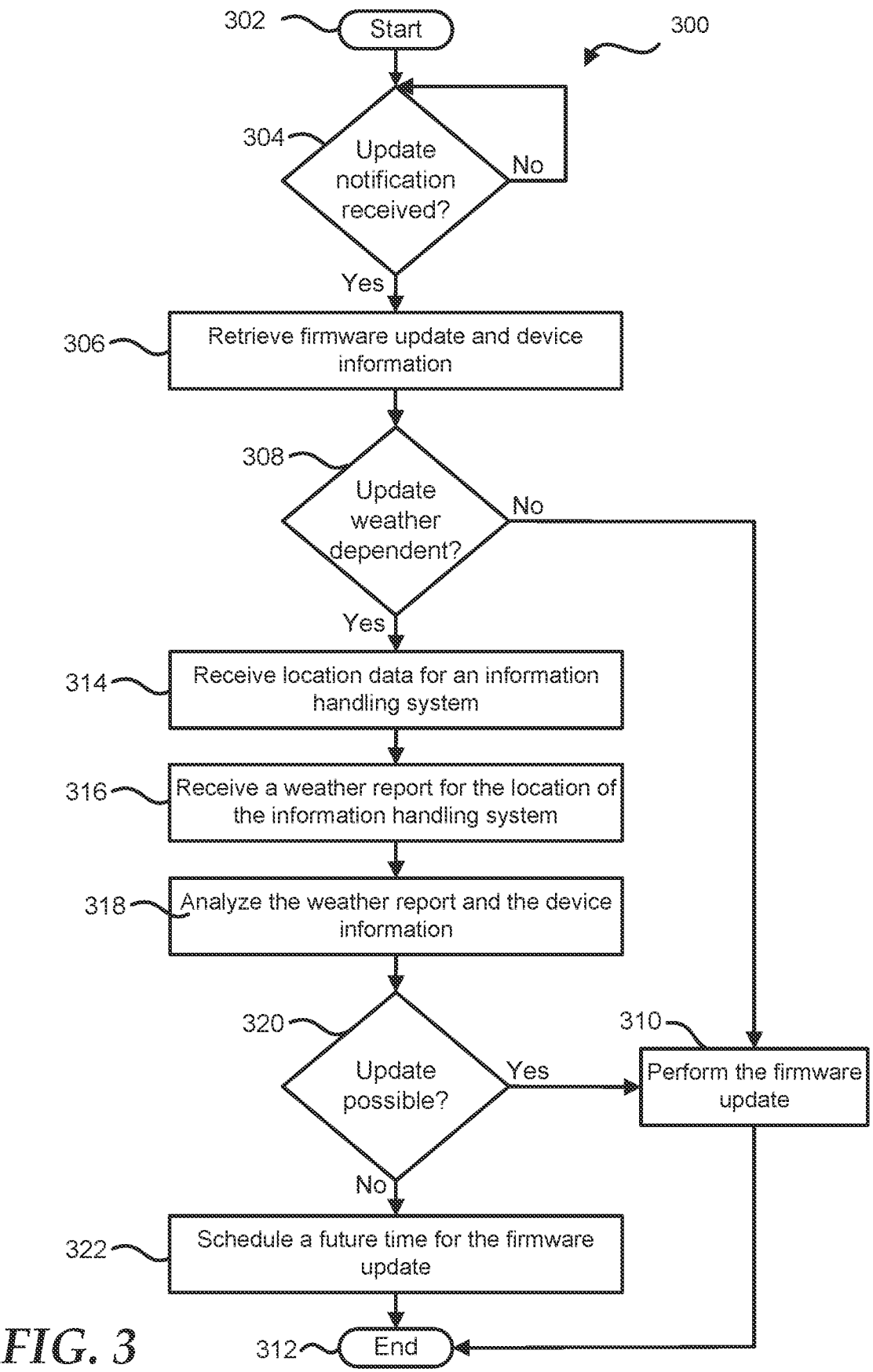
FIG. 3 is a flow diagram of a method for performing a firmware update based on weather conditions at an information handling system according to at least one embodiment of the present disclosure.

FIG. 3 illustrates a flow of a method 300 for performing a firmware update based on weather conditions at an information handling system according to at least one embodiment of the present disclosure, starting at block 302. In an example, method 300 may be performed by any suitable component including, but not limited to, processor 110, baseboard management controller 114, and weather circuitry 116 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 304, a determination is made whether an update notification has been received within an information handling system. In response to the update notification being received, a firmware update and device/component information is retrieved at block 306. In an example, the firmware update and the device/component information may be retrieved from an update catalog in an update server.

At block 308, a determination is made whether the update is weather dependent. In an example, the update may be weather dependent based on the component associated with the update being a critical component within the information handling system. In certain examples, a critical component may be any suitable component that is utilized to regulate a temperature of other components of the information handling system. For example, critical components may include, but are not limited to, a cooling fan and a microcontroller unit.

If the update is not weather dependent, the firmware update is performed at block 310 and the flow ends at block 312. In an example, performance of the firmware update may include an update notification being provided to an administrator of the information handling system. If the update is weather dependent, location data for the information handling system is received at block 314. In certain examples, the location data may include a geographic location of the information handling system, and the location data may be included in the device/component information received from the catalog.

At block 316, a weather report for the location of the information handling system is received. In an example, the weather report may be received from any suitable weather service and may include a prediction of temperatures at the location of the information handling system at future times. The weather report may also include a current temperature at the location of the information handling system. At block 318, the weather report and the device information are analyzed. In an example, the device information may include a threshold temperature for the component associated with the update. In certain examples, the analyzation of the weather report and the device information may include a determination of whether the current temperature at the location of the information handling system is beyond the threshold temperature.

At block 320, a determination is made whether the update is possible. In an example, the update is possible if the current temperature is not beyond the threshold temperature. The update may not be possible if the current temperature is beyond the threshold temperature. If the update is possible, the update is performed at block 310 and the flow ends at block 312. During the performance of the update, an update completion notification may be provided to an administrator of the information handling system. If the update is not possible, a future time for the firmware update is scheduled at block 322 and the flow ends at block 312. If the update is possible, the update is performed at block 310 and the flow ends at block 312. Based on the future time being schedule for the update, update schedule notification may be provided to an administrator of the information handling system, and the update schedule notification may include a day and time that the update may be performed.

Figure 4:
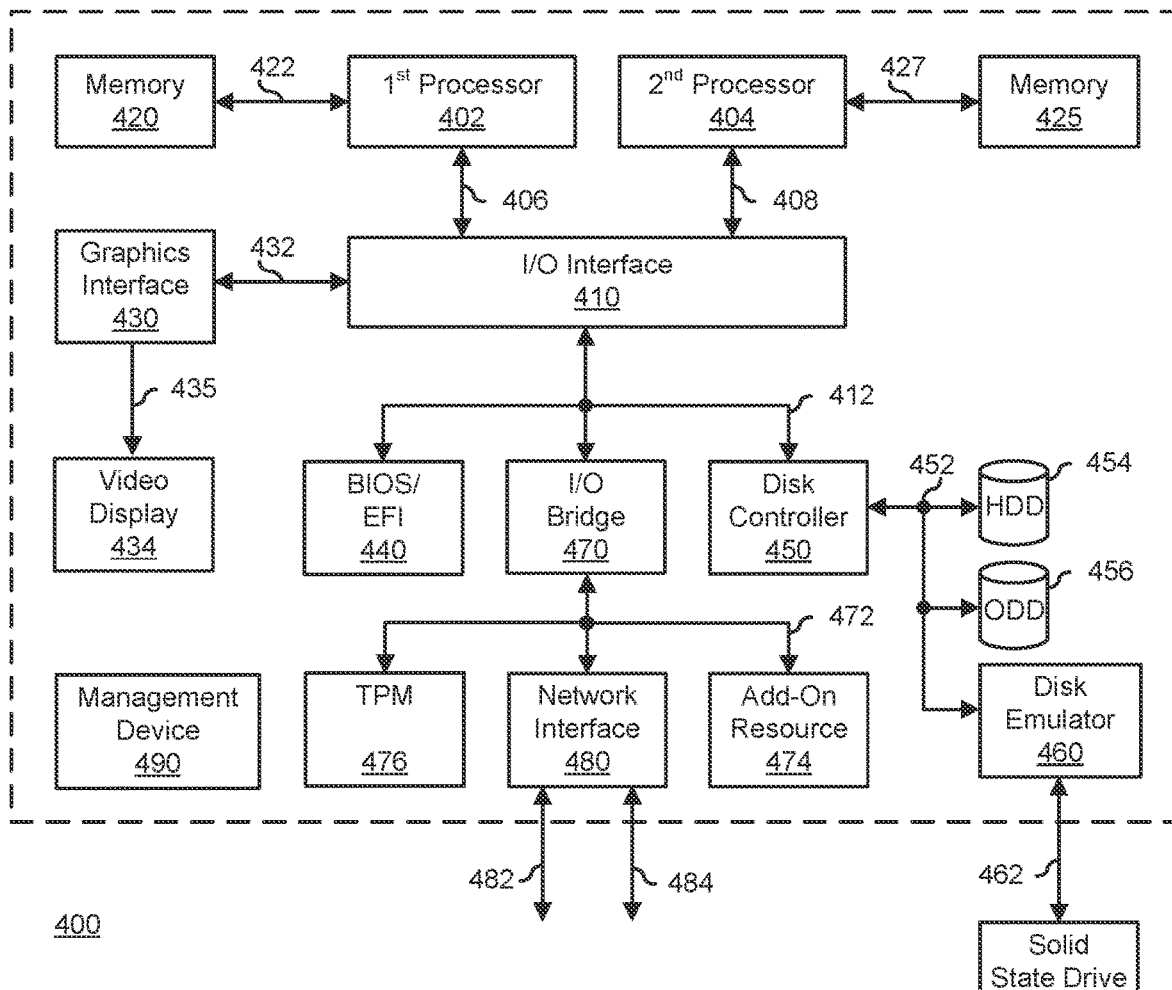
FIG. 4 is a block diagram of a general information handling system according to an embodiment of the present disclosure.

FIG. 4 shows a generalized embodiment of an information handling system 400 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. An information handling system comprising:
   a storage configured to store a firmware update for a component of the information handling system; and
   a processor to communicate with the storage, the processor to:

receive a firmware update notification, wherein the firmware update notification is associated with the firmware update for the component;

determine whether the component is weather dependent, wherein the component is weather dependent based on the component being a critical component within the information handling system; and in response to the firmware update being weather dependent, the processor further to:

determine whether the firmware update currently may be performed based on a weather report for a location of the information handling system; and in response to a determination that the firmware update currently may not be performed, schedule a future time to perform the firmware update based on the weather report.

2. The information handling system of claim 1, wherein prior to the determination of whether the firmware update may be performed, the processor further to: receive data associated with the component from a threshold catalog, wherein the data indicates a threshold update temperature for the component.

3. The information handling system of claim 2, wherein the determination that the firmware update currently may not be performed includes the processor to determine that the weather report indicates that a current temperature at the location of the information handling system is greater than the threshold update temperature.

4. The information handling system of claim 2, wherein the firmware update for the component is not performed when a temperature of the component is above the threshold update temperature.

5. The information handling system of claim 1, wherein the weather report indicates a current temperature and future temperatures at the location of the information handling system.

6. The information handling system of claim 1, wherein in response to a determination that the firmware update may be performed, the processor further to: perform the firmware update on the component.

7. The information handling system of claim 6, wherein the processor further to: receive the weather report from a weather data service.

8. The information handling system of claim 1, in response to the firmware update not being weather dependent, the processor further to: perform the firmware update for the component.

9. A method comprising:

storing, in a storage of a first information handling system, a firmware update for a component of the information handling system;

receiving, by a processor of the information handling system, a firmware update notification, wherein the firmware update notification is associated with the firmware update for the component;

determining whether the component is weather dependent, wherein the component is weather dependent based on the component being a critical component within the information handling system; and in response to the firmware update being weather dependent:

determining whether the firmware update currently may be performed based on a weather report for a location of the information handling system; and in response to a determination that the firmware update currently may not be performed, scheduling, by the processor, a future time to perform the firmware update based on the weather report.

10. The method of claim 9, wherein prior to the determination of whether the firmware update may be performed, the method further comprises: receiving data associated with the component from a threshold catalog, wherein the data indicates a threshold update temperature for the component.

11. The method of claim 10, wherein the determination that the firmware update currently may not be performed further includes: determining that the weather report indicates that a current temperature at the location of the information handling system is greater than the threshold update temperature.

12. The method of claim 10, wherein the firmware update for the component is not performed when a temperature of the component is above the threshold update temperature.

13. The method of claim 9, wherein the weather report indicates a current temperature and future temperatures at the location of the information handling system.

14. The method of claim 9, wherein in response to a determination that the firmware update may be performed, the method further comprises: performing the firmware update on the component.

15. The method of claim 14, wherein the method further comprises: receiving the weather report from a weather data service.

16. The method of claim 9, in response to the firmware update not being weather dependent, the method further comprises: performing the firmware update for the component.

17. A method comprising:

storing, in a storage of a first information handling system, a firmware update for a component of the information handling system;

receiving, by a processor of the information handling system, a firmware update notification, wherein the firmware update notification is associated with the firmware update for the component; and if the firmware update is weather dependent, then:

receiving a weather report for a location of the information handling system from a weather data service, wherein the weather report indicates a current temperature at the location of the information handling system, wherein the component is weather dependent based on the component being a critical component within the information handling system;

receiving data associated with the component from a threshold catalog, wherein the data indicates a threshold update temperature for the component; and if the firmware update currently may not be performed based on the current temperature and the threshold update temperature, then scheduling, by the processor, a future time to perform the firmware update based on the weather report.

18. The method of claim 17, wherein the weather report further indicates future temperatures at the location of the information handling system.

19. The method of claim 17, wherein the future time to perform the firmware update is based on the future temperatures at the location of the information handling system.

20. The method of claim 17, wherein in response to a determination that the firmware update may be performed, the method further comprises: performing the firmware update on the component.

* * * * *